March 13, 1956 P. H. ARMSTRONG 2,738,496
SLEEP INHIBITING AND CONTROL DEVICE FOR VEHICLES
Filed Aug. 12, 1952 4 Sheets-Sheet 1
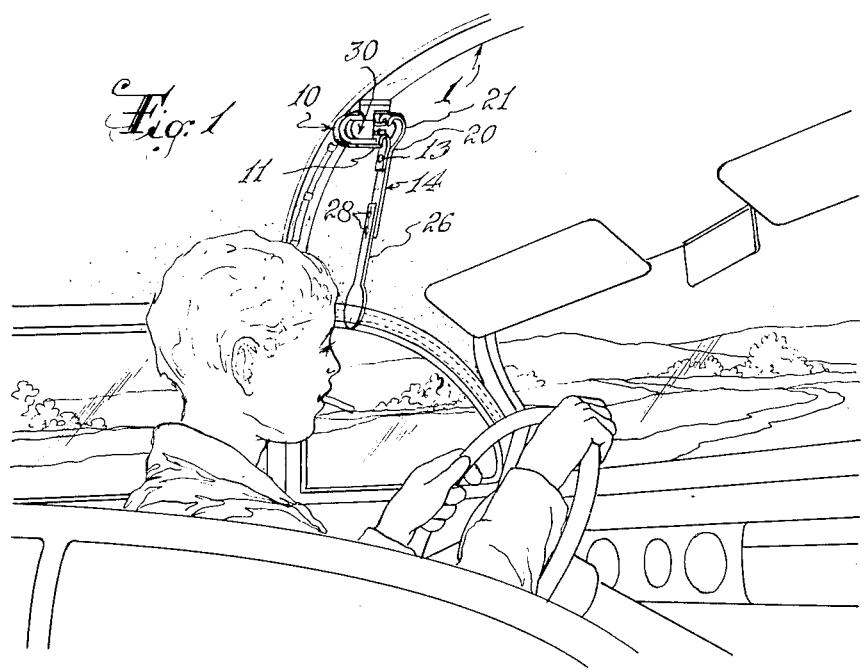
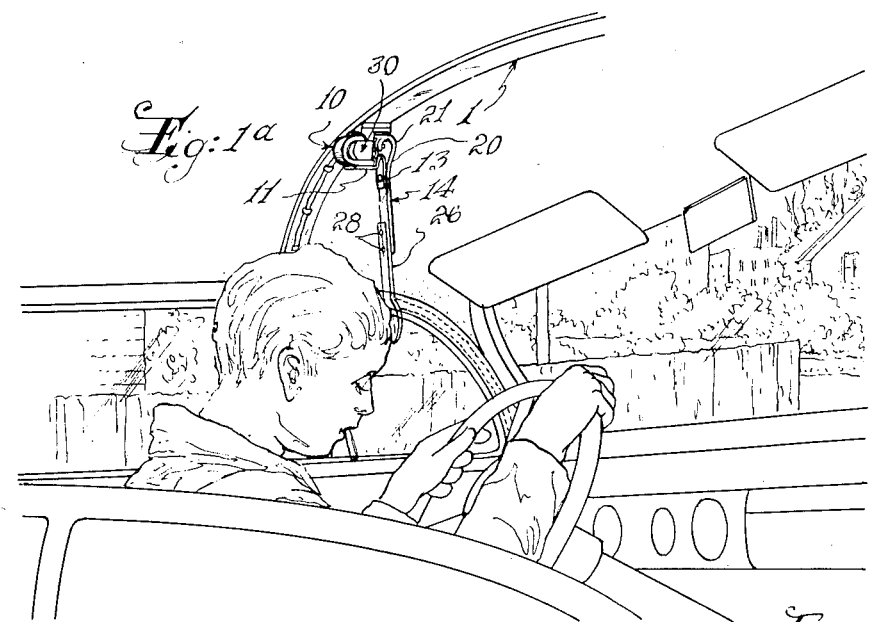
Inventor:
Paul H. Armstrong
BY Harry B. Cook,
Attorney.

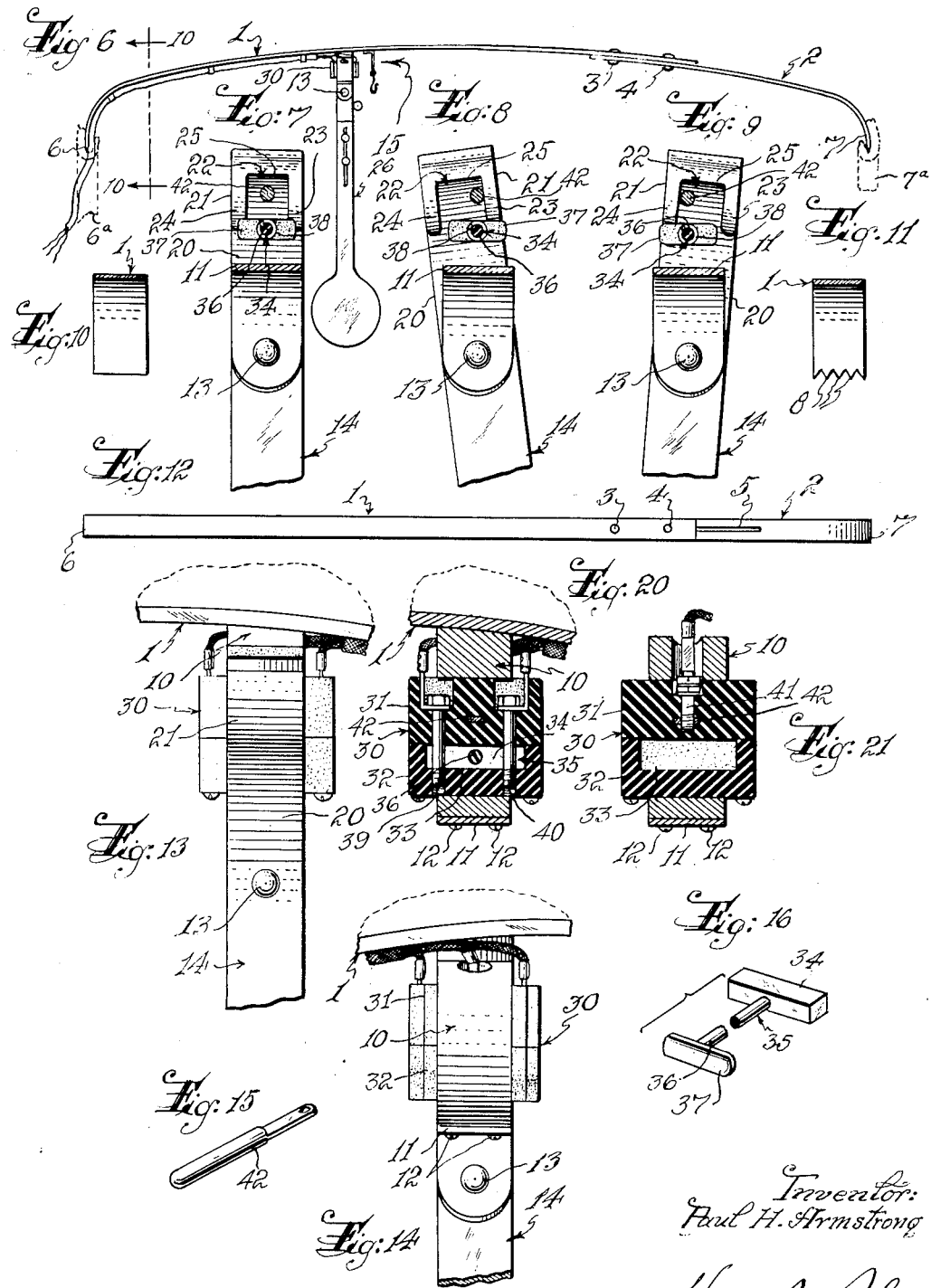

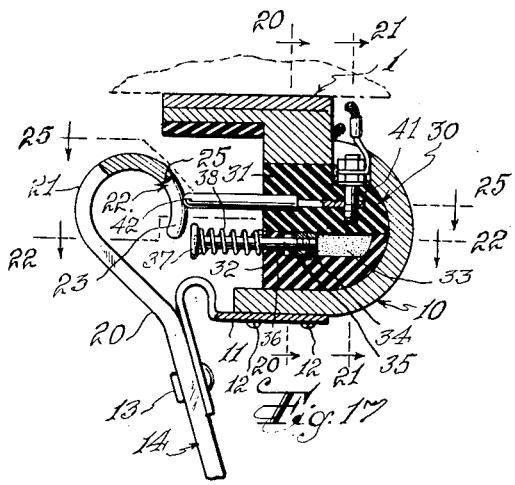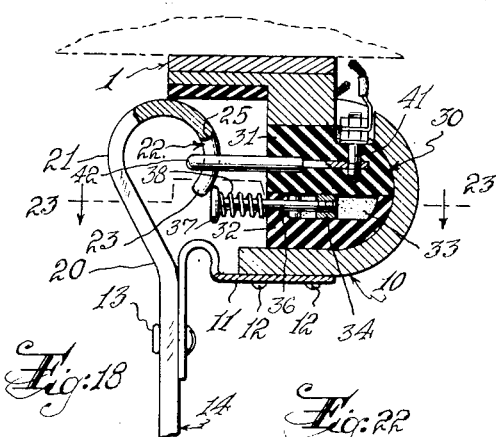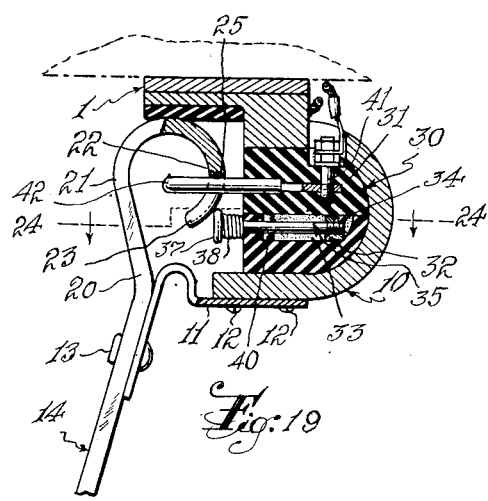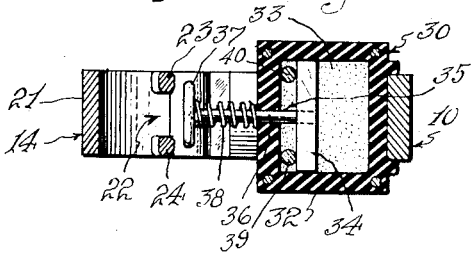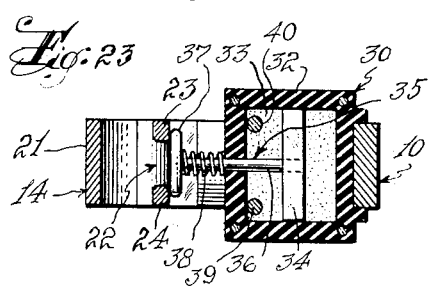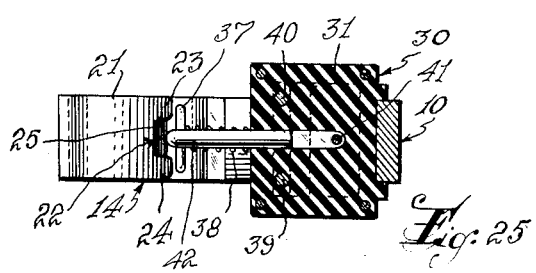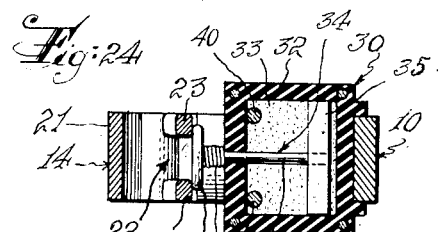

March 13, 1956     P. H. ARMSTRONG     2,738,496
SLEEP INHIBITING AND CONTROL DEVICE FOR VEHICLES
Filed Aug. 12, 1952     4 Sheets-Sheet 4
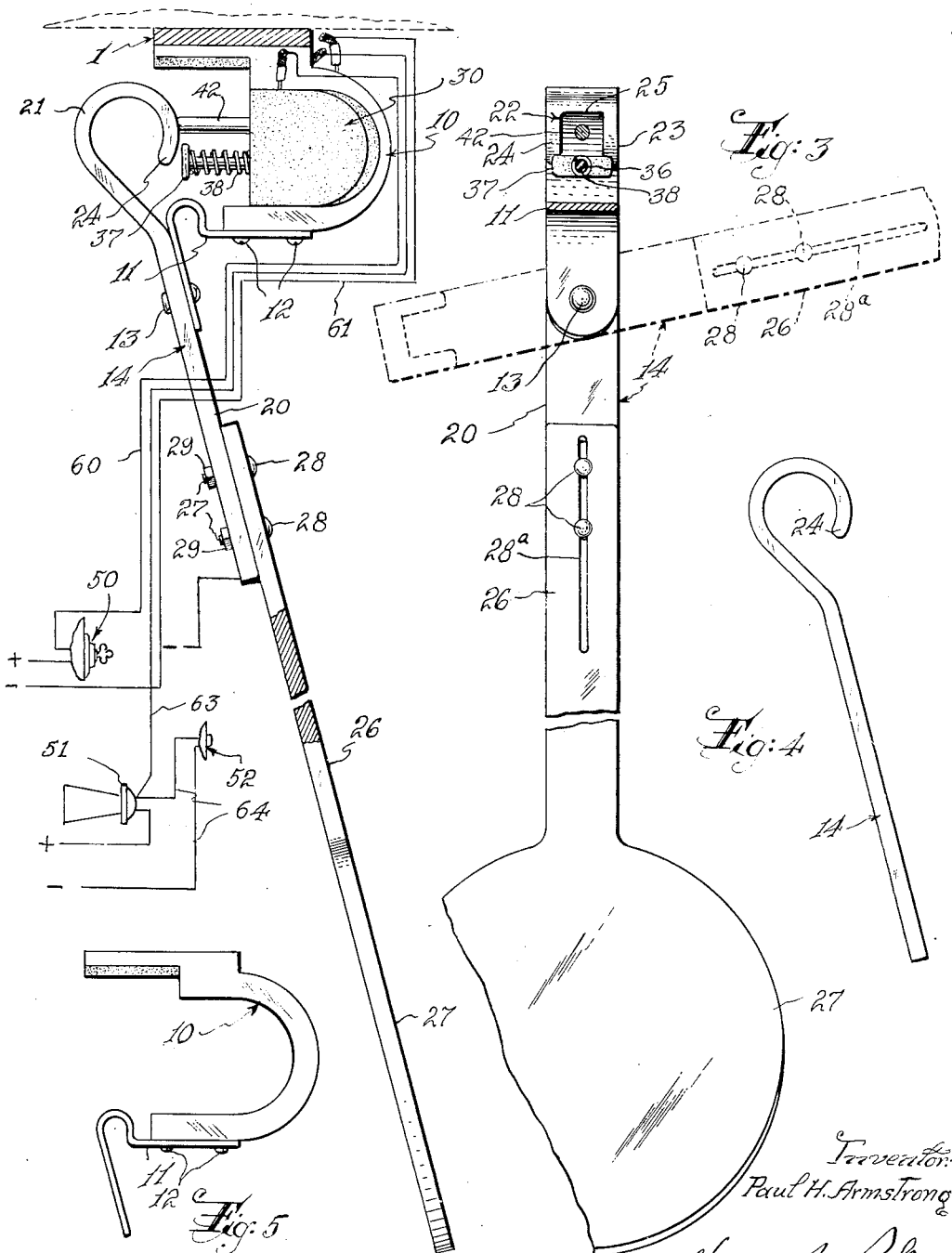

United States Patent Office 2,738,496
Patented Mar. 13, 1956

2,738,496

SLEEP INHIBITING AND CONTROL DEVICE FOR VEHICLES

Paul H. Armstrong, Orange, N. J.

Application August 12, 1952, Serial No. 303,924

4 Claims. (Cl. 340—279)

My invention relates to an automatic signal and motor cut-off device for drivers. More particularly my invention relates to a device which is actuated by a driver about to lose consciousness for the purpose of discontinuing the operation of the car motor thereby causing the vehicle to slow down and for operating an audible signal such as the horn to warn the driver of impending danger.

It is an object of my invention to provide a novel and improved device of the character described which is installable overhead in the car for actuation by the nodding head of a driver.

It is another object of my invention to provide a novel and improved device of this type which is operated at least in part by either a forward or a side movement of the driver's head.

It is still another object of my invention to provide such a device having an actuating member which is to be operated by the driver's head and which is constructed of a transparent plastic material so as not to materially interfere with thed river's vision and is swingable to a substantially horizontal out-of-the-way position overhead where it may be located when not in use.

It is yet another object of my invention to provide in a device of the type mentioned novel and improved contact means for interrupting operation of the car motor and initiating operation of an audible signal.

Other objects and advantages of my invention will appear as the course of the specification progresses.

According to my invention there is provided a pair of relatively slidable members installable in the roof of a car with opposite ends supportable by opposite door frames and having an actuating member connected thereto by suitable means which actuating member may be positioned in close proximity to the driver's head for actuation thereby. The actuating member may be moved by the driver's head toward the front of the car and to the side when the device has been properly installed, and is swingable to a substantially horizontal position overhead where it may be secured when not in use. The lower portion of the actuating member is preferably formed of a transparent plastic material so as not to obstruct a portion or the driver's normal range of vision. Suitable circuit means including contacts controlled by the actuating member are provided for interrupting the operation of the motor and for initiating operation of an audible signal such as the car horn when the actuating member is moved forward by the driver's head. Such circuit means are effective to set the signal in operation when the actuating member is moved to the side.

I shall describe one form of my invention and then point out the novel features thereof in claims.

In the accompanying drawings:

Figure 1 is a perspective view showing my device as it appears when properly installed in the roof of a car.

Figure 1ª is a view similar to Fig. 1 showing the manner in which the device is operated by the head of a nodding driver;

Figure 2 is an enlarged end view of the device including a diagrammatic showing of the circuit means for interrupting the operation of the motor and initiating operation of the signal;

Figure 3 is an enlarged view of the actuating member;

Figure 4 is an end view of the upper portion of the actuating member;

Figure 5 is an end view of the housing and hinge member for connecting the actuating member to the relatively slidable members installable overhead in the roof;

Figure 6 is a front view of the actuating member and slidable overhead members installable in the roof to which the actuating member is connected;

Figures 7, 8 and 9 are rear views of the upper portion of the actuating member wherein the actuating member is shown in its normal position in Fig. 7 and in opposite extreme positions in Figs. 8 and 9 to which it may be pivoted to engage a contact member;

Figures 10 and 11 are fragmentary views of different forms of an end portion of one of the aforesaid relatively slidable overhead members;

Figure 12 is a top plan view of the relatively slidable overhead members;

Figure 13 is a fragmentary front view of an upper portion of the device;

Figure 14 is a view similar to Fig. 13 but taken from the rear;

Figures 15 and 16 are perspective views of the contact members which are part of the contact structure included in the control circuits;

Figures 17, 18 and 19 are vertical sectional views showing the actuating member in successive positions for operating the contacts of the control circuits;

Figure 20 is a vertical sectional view taken on the plane of the line 20—20 of Fig. 17;

Figure 21 is a vertical sectional view taken on the plane of the line 21—21 of Fig. 17;

Figure 22 is a horizontal sectional view taken on the plane of the line 22—22 of Fig. 17;

Figure 23 is a horizontal sectional view taken on the plane of the line 23—23 of Fig. 18;

Figure 24 is a horizontal sectional view taken on the plane of the line 24—24 of Fig. 19;

Figure 25 is a horizontal sectional view taken on the plane of the line 25—25 of Fig. 17.

Referring to the drawings, reference characters 1 and 2 designate a pair of elongated members which are connected by pins 3 and 4 on member 1 extending through a slot 5 in member 2 to render the members slidable relative to each other. The members are formed to the contour of the roof of the car and are supportable at opposite ends 6 and 7 on opposite door frames 6a and 7a of the car. Variations in distance between the door frames found in cars of different make and year may be compensated for merely by slidably adjusting members 1 and 2 until the aforementioned ends rest upon the door frames. If desired each of ends 6 and 7 may be formed with toothlike projections 8 as shown in Fig. 11 to grip the upholstery above the door frames and so prevent connected members 1 and 2 from sliding toward the front or rear of the car.

Suitably secured at one end to the underside of slidable member 1 at a distance from end 5 substantially corresponding to the distance from the door frame upon which end 5 is to be supported to the center of the steering wheel, which distance is approximately the same in most cars, is a U-shaped housing 10. Housing 10 has a flexible hinge member 11 secured thereon by screws 12 at its other end which hinge member is pivotally connected by pivot member 13 to an actuating member 14. Actuating member 14 extends at a slight angle from the vertical in its normal use position in the car but it can be moved when not in use about pivot member 13 to a substantially horizontal position overhead of the driver where it may be held by any suitable means as for example a hook 15 on member 1.

Actuating member 14 includes an upper portion 20 formed of a conducting material and having a curved end portion 21. Curved end portion 21 is cut out or cut away as at 22 to form a forked end with fingers 23 and 24 extending from the extreme end of portion 21 a substantial portion of the distance around curved end portion 21 to edge 25. Actuating member 14 also includes a lower portion 26 preferably formed of a transparent plastic material and having an enlarged disc-shaped end 27 to contact the head of a nodding driver. Lower portion 26 is connected to upper portion 20 by bolts 28 extending through a slot 28a in lower portion 22 and nuts 29 on the said bolts to render lower portion 26 slidably adjustable with respect to upper portion 20 and securable in a chosen position by tightening nuts 29 so that the enlarged end 27 of lower portion 26 may be positioned at the level of the driver's forehead.

Within housing 10 is an insulating block 30 comprising sections 31 and 32. Section 32 includes a recess 33 having the plunger 34 of a contact member 35 slidably mounted therein between sections 31 and 32. Contact member 35 also includes an elongated bar 36 secured at one end to plunger 34 and extending through the block. An elongated contact button 37 is formed on the other end of the bar and a spring 38 is provided on bar 36 between button 37 and block 30 to normally bias contact member 35 so as to place plunger 34 in contact with a pair of contact elements 39 and 40 fixedly mounted in the block and extending through recess 33. With contact member 35 in its normally biased position control button 37 is located in close proximity to the curved end portion 20 of actuating member 14. Also fixedly mounted in section 31 is a terminal 41, and a contact member 42 is mounted in section 31 in parallel spaced relationship to contact member 35 and extends therefrom into the cut-away portion 22 of curved end portion 21 with actuating member 14 in its normal use position.

Contact member 35 and contact elements 39 and 40 define a normally closed contact which as shown in Fig. 23 is connected in series in a first circuit with the ignition switch 50 so that the ignition may be turned on or off by the switch while the contact maintains its normally closed position but will be turned off although the switch is in an "on" position when the contact is actuated to an open position. Such first circuit extends from the positive terminal of a battery designated in the drawings by a (+) sign through ignition switch 50, through the ignition circuit omitted for the purpose of simplifying the drawing and wire 60, through the contact defined by member 35 and contact elements 39 and 40 provided the contact is closed, and thence through wire 61 to the negative terminal of the battery designated by a (—) sign.

Contact members 42 and edge 25 at the bottom of the cut-out 22 define a normally open contact which is connected in series in a second circuit with the horn 51. This second circuit extends from the positive terminal of the battery through horn 51, through wire 63 and the contact defined by contact member 42 and edge 25 provided such contact is closed, through upper portion 20 of actuating member 14 and thence to the negative terminal of the battery. An additional circuit path to the negative terminal of the battery including horn button 52 and wires 64 connected in parallel with that portion of the second circuit extending from the horn through the normally open contact and upper portion 20 provides for the operation of the horn by the horn button independently of the operation of the aforementioned normally open contact.

Assume members 1 and 2 to have been so installed in the roof above the door frames and lower portion 22 of actuating member 14 having been so adjusted as to position the enlarged end 27 of actuating member 14 in close proximity to a driver's forehead. Assuming further that the ignition switch is on and the car is being operated, when end 27 is moved forward by the nodding head of a sleepy or sick driver actuating member 14 is swung in a vertical plane on hinge member 11 to cause the forked ends 23 and 24 of upper portion 20 to depress contact button 37 and move plunger 34 of contact member 35 out of contact with elements 39 and 40 to open the normally closed contact defined by these parts thereby opening the aforementioned first circuit and cutting off the current to the ignition whereupon the motor ceases to operate and the car slows down. The forward movement of end 27 also brings edge 25 at the end of cut-out 22 in contact with contact member 42 to close the normally open contact in the second energizing circuit. The second energizing circuit is closed in this manner to operate the horn and warn the driver of impending danger.

A side motion of actuating member 14 caused for example by the driver merely brushing enlarged end 27 to move the actuating member about pivot member 13 in another vertical plane that is perpendicular to the first-mentioned vertical plane of movement of the actuating member, will cause one or the other of forked ends 23 or 24 to engage contact member 42 thereby closing the second circuit and operating the horn to warn the driver (Figs. 7–9).

Although I have herein shown and described only one form of apparatus embodying the features of my invention, it is to be understood that various changes and modifications may be made therein within the scope of the appended claims without departing from the spirit and scope of my invention.

What I claim is:

1. The combination with a motor and the ignition circuit therefor on a motor vehicle, of a normally closed switch mounted on the motor vehicle for controlling said circuit and including an operating button, an insulated support for said switch, an actuator having an end portion of conducting material, a hinge member hingedly connecting said actuating member intermediate its ends to said support to swing in one vertical plane from front to rear of the motor vehicle, means mounting said support on a motor vehicle with said end of said actuator adjacent said operating button and the other end of said actuator normally yieldingly held in a position forwardly of and spaced from the head of the driver of the vehicle when said driver is seated in normal driving position and conscious, the second-mentioned end of said actuator being engageable and movable by the forwardly nodding head of said driver to cause engagement of the first-mentioned end of said actuator with said operating button to open said switch, another contact element fixedly mounted in said support, the first-mentioned end of said actuator having a portion cut away and said first-mentioned end of the actuator being normally disposed with the edge of the cut-away portion in spaced relation to said contact element, said contact element projecting into the space formed by said cut-away portion during said movement of the actuator on the hinge member for eventual contact of said edge of said cut-away portion with said contact element, an electrical signal, and a circuit including said signal, said contact element and said conducting portion of said first-mentioned end of the actuator for energizing said signal upon contact of said conducting portion with said contact element.

2. The combination as defined in claim 1 with the addition of means mounting said actuator on said hinge member so that the actuator may be swung in a vertical plane transversely of the vehicle and perpendicularly to the first-mentioned plane of swinging of the actuator, to bring the edge of said cut-away portion into contact with said contact element.

3. In an automatic signal and motor cut-out device, the combination of a housing, an insulating block in said housing, a pair of contact elements fixedly mounted in the block, a movable contact member slidable in the block, means normally biasing said contact member into engagement with said contact elements, a third contact element fixedly mounted in the block, an actuating member of conducting material having a returned end portion, a hinge member hingedly connecting said actuating member intermediate its ends to swing in one vertical plane and with the returned end portion in close proximity to the contact member, the returned end portion of the actuating member having a portion cut away, said returned end portion being normally disposed with the edge of the cut-away portion in spaced relation to said third contact element, said first-mentioned contact member being actuated by said returned end portion while the third contact element projects into the space formed by said cut-away portion during movement of the actuating member on the hinge member in said plane for eventual contact of the edge of said cut-away portion with said third contact element.

4. In an automatic signal and motor cut-out device as defined in claim 3, the addition of means pivotally connecting said actuating member to the hinge member so that the actuating member may be swung in a vertical plane perpendicular to the first-mentioned plane of swinging of the actuating member, to bring the edge of said cut-away portion into contact with the third contact element.

References Cited in the file of this patent

UNITED STATES PATENTS

| | | |
|---|---|---|
| 956,952 | Emden et al. | May 3, 1910 |
| 1,625,505 | Stump et al. | Apr. 19, 1927 |
| 2,066,092 | Brown | Dec. 29, 1936 |
| 2,215,985 | Stankey | Sept. 24, 1950 |

FOREIGN PATENTS

| | | |
|---|---|---|
| 645,788 | Germany | May 13, 1937 |